Patented Nov. 12, 1940

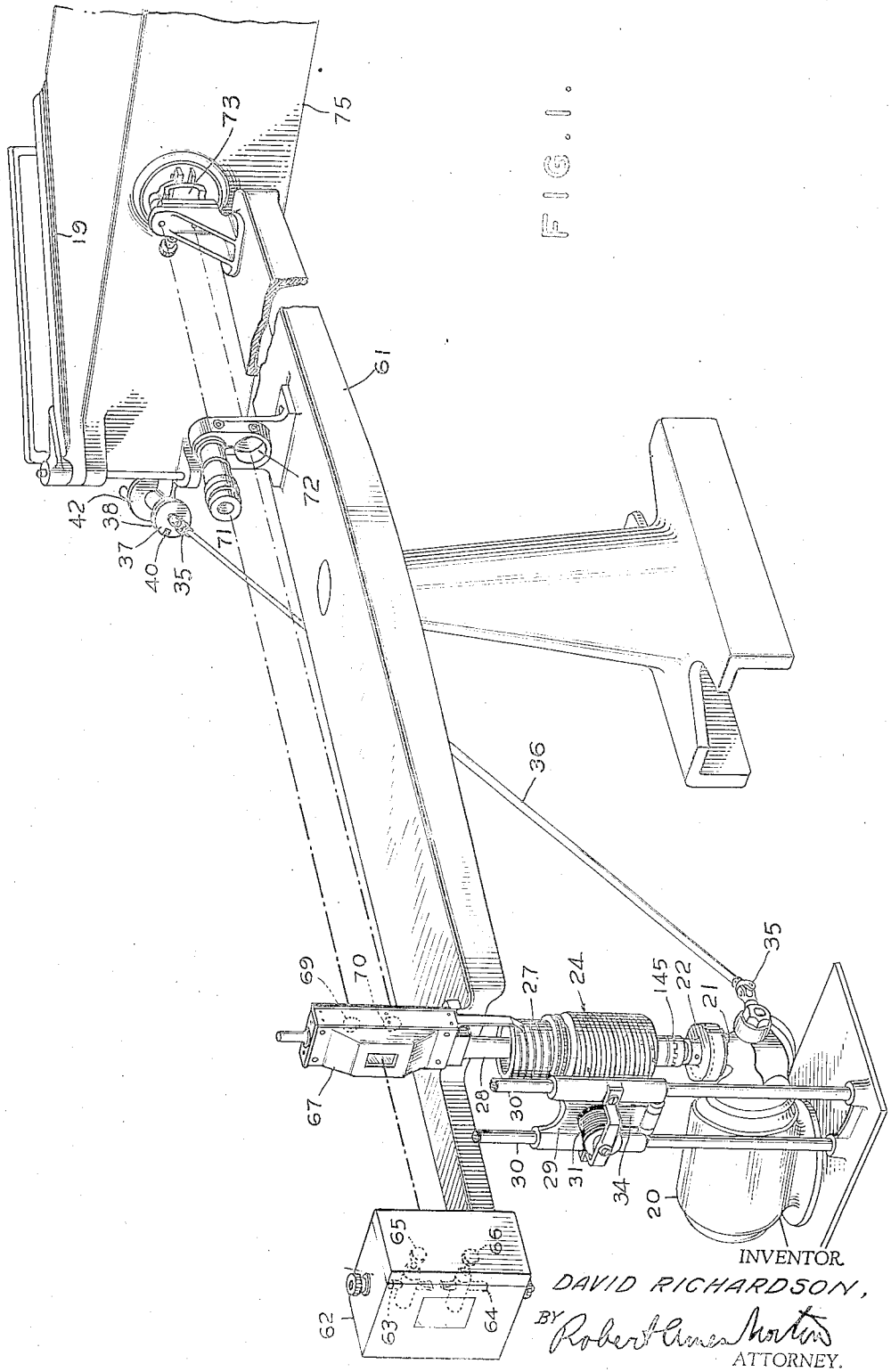

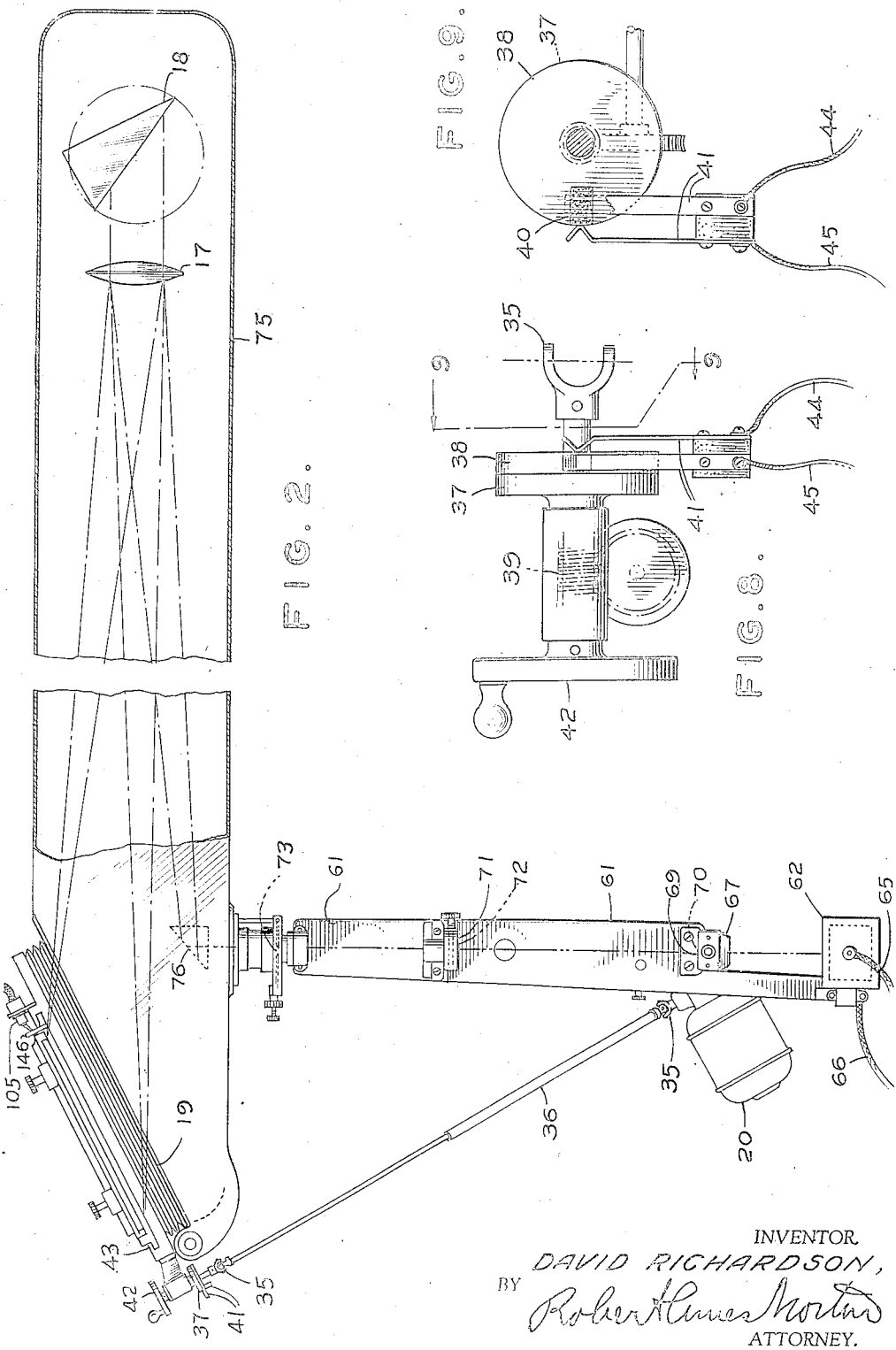

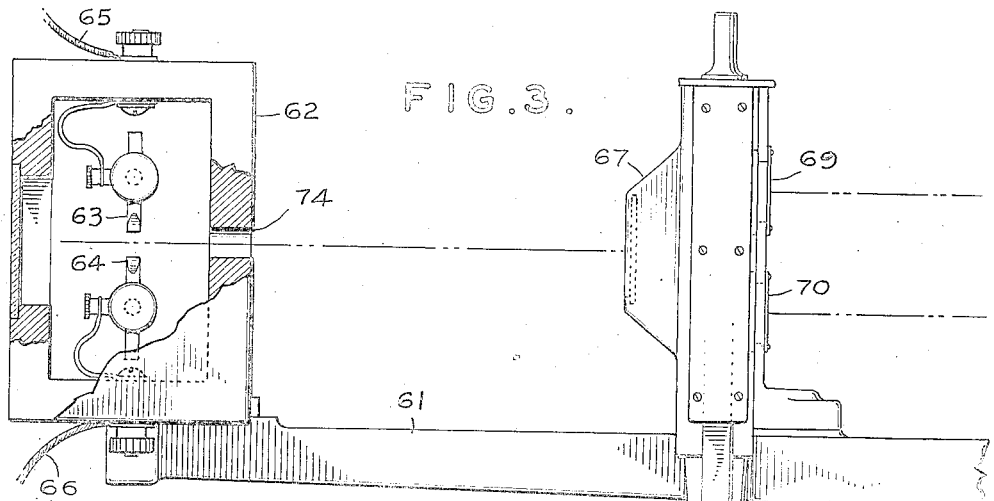
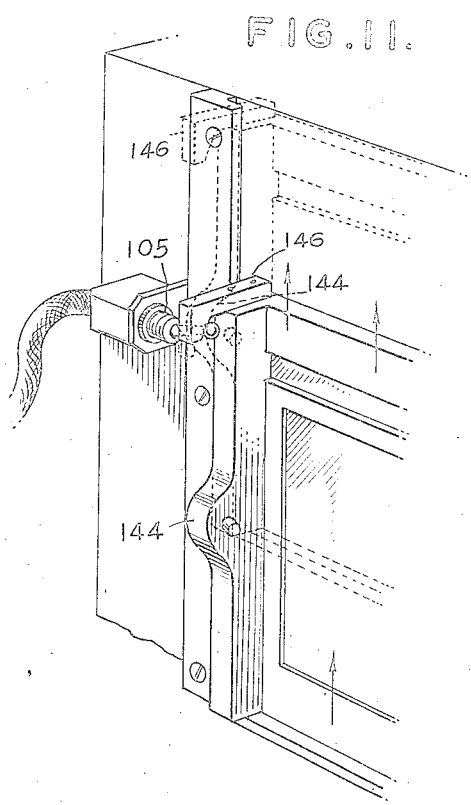
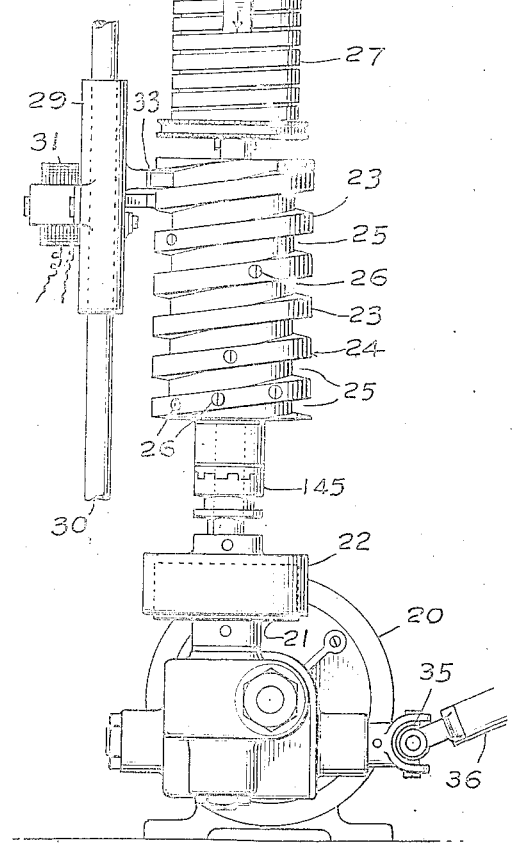

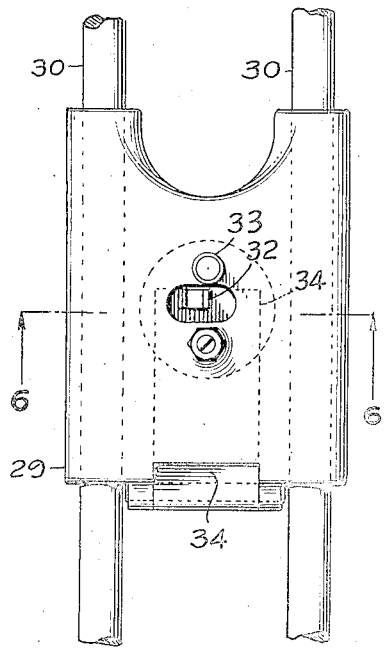
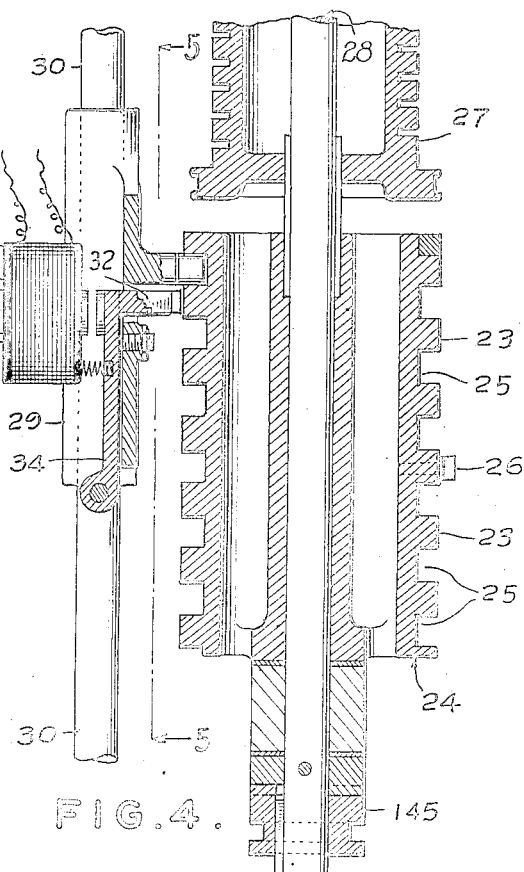
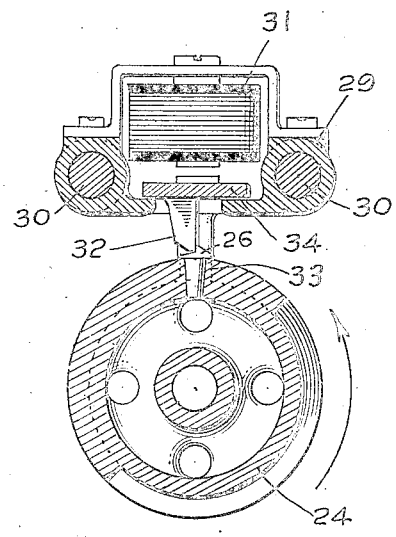
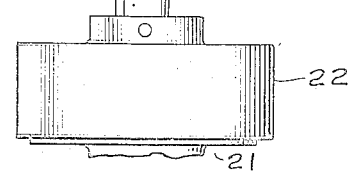

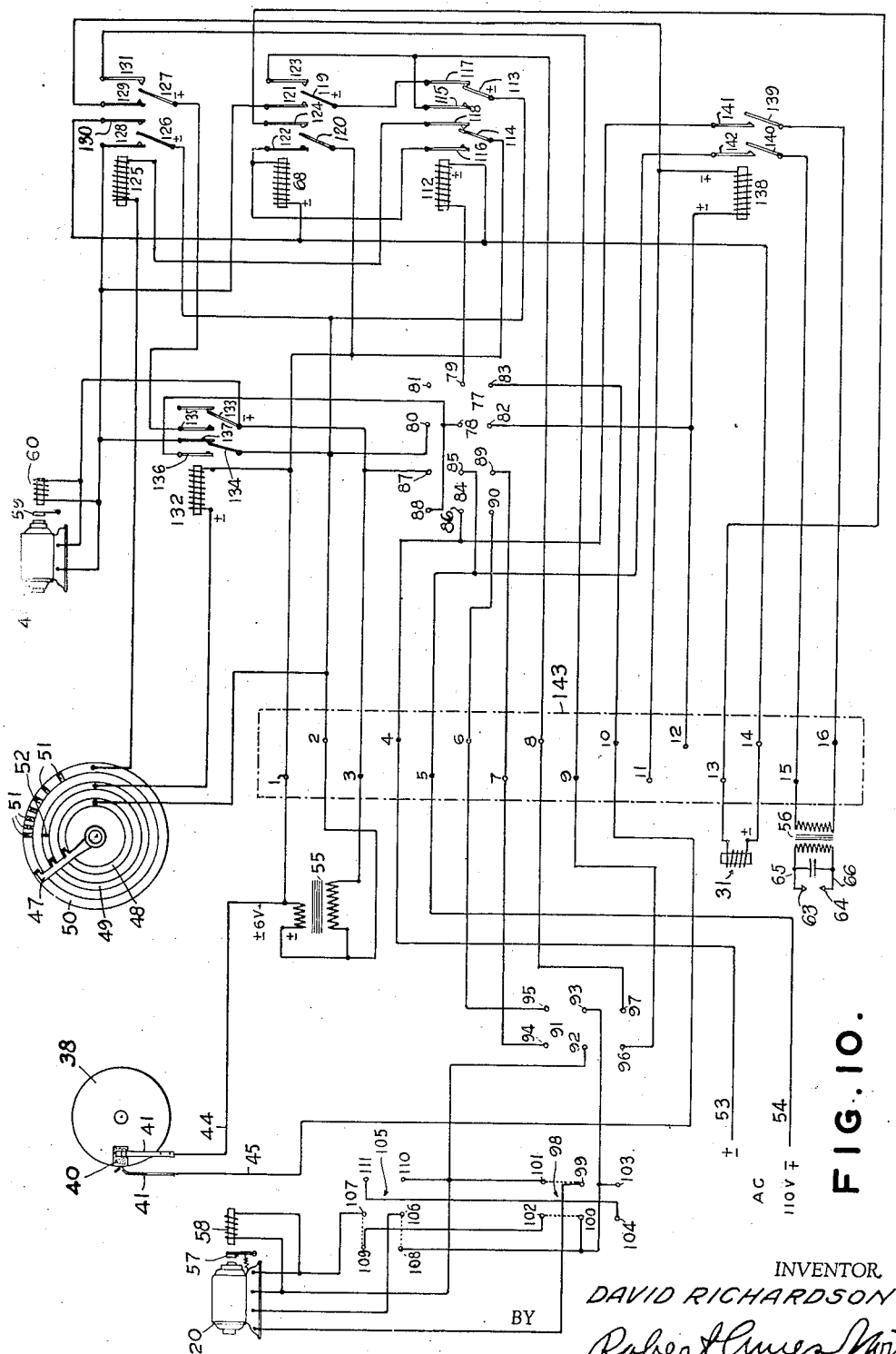

2,221,170

UNITED STATES PATENT OFFICE 2,221,170

AUTOMATIC SPECTROPHOTOMETER

David Richardson, Old Greenwich, Conn., assignor to American Cyanamid Company, New York, N. Y., a corporation of Maine Application October 14, 1938, Serial No. 235,112

3 Claims. (Cl. 88—14)

This invention relates to an automatic spectrophotometer employing two cyclic drives driven from a single driving source, one remaining constant and the other varying in length.

A well-known spectrophotometer records a series of spectra on a photographic plate which is moved between successive exposures. This spectrophotometer employs radiant energy divided into two beams passing respectively through sample and standard, the exposure being increased through the sample and kept substantially constant through the standard by varying the intensity of the latter beam in inverse proportion to the exposure length. This type of spectrophotometer which has been used very successfully for ultraviolet spectrography has hitherto required manual setting between successive exposures because the two portions of the spectrophotometer which are moved, namely the holder for plate or other photographic material and the device for varying the intensity of the standard beam, which is usually effected by a suitable variable aperture or diaphragm, do not both move through cycles of uniform length. The movement of the plate holder is uniform between successive exposures but the movement of the intensity varying device members is non-uniform. Where it is desired that the portions of the sample beam spectra which are used for comparison with the standard spectra should vary in density by uniform linear steps, the usual case, the exposure time cycles must vary substantially logarithmically due to the nature of the photographic emulsion. If the exposure of the beam not passing through the sample is to be maintained substantially constant, the aperture changes must also be logarithmic and inversely proportional to the exposure times.

Automatic operation of the plate holder and intensity varying device would normally require separate driving sources for the two members to be moved, which involves additional complication and does not permit rigid synchronism between the cycles of movement of the two members.

Broadly the present invention includes a driving source, a positive drive to the elements moving the photographic plate which operates through cycles of constant length, a drive through a slipping clutch to the intensity varying elements which operate through cycles of varying length and an element or elements positively connected between the slipping clutch and the intensity varying members provided with stops engaging with a ratchet and spaced so as to produce the desired variations in cycle drive length together with means for releasing the ratchet at the beginning of each cycle.

While the exact form of the stop and ratchet device used in the present invention is not critical, a very simple and rugged device consists in a cylinder with a helical groove which engages a member moving the ratchet device along the axis of the cylinder and stops or pins located on the spiral land between the grooves and striking against the pawl in its normal or engaged position.

The present invention permits operating a spectrophotometer of the type described above automatically to give a series of spectrograms on the same plate corresponding to varying exposures of the sample with constant exposure of the standard. The description will be made in conjunction with drawings in which:

Fig. 1 is a perspective of a portion of a spectrophotometer utilizing the present invention;

Fig. 2 is a horizontal section through the spectrophotometer;

Fig. 3 is a detail vertical elevation of a portion of the photometer showing the variable timing mechanism on a larger scale;

Fig. 4 is an enlarged vertical section through the timing mechanism;

Fig. 5 is a vertical section at right angles to Fig. 4 along the line 5—5 thereof;

Fig. 6 is a horizontal section along the line 6—6 of Fig. 5;

Fig. 7 is a perspective of the ratchet element and a stop on an enlarged scale;

Fig. 8 is a detail elevation of the plate moving drive;

Fig. 9 is a vertical section along the line 9—9 of Fig. 8;

Fig. 10 is a wiring diagram showing control mechanism for the spectrophotometer;

Fig. 11 is a vertical perspective illustrating the operation of a reversing switch by the plate holder carriage.

The spectrophotometer shown in Figs. 1 and 2 consists of a frame 61 on which is mounted a source of light 62 which is shown as a spark gap between two electrodes 63 and 64 fed through the wires 65 and 66. The spark box is provided with a suitable exit window 74 from which a beam of radiation, for example ultra-violet light, emerges. This beam passes through the beam splitting device 67 which is of conventional design causing two parallel beams to pass out through the exit openings 69 and 70. The lower opening 70 is provided with a diaphragm of conventional design which is operated through the threaded shaft 28 connected to a cylinder 27 carrying a spiral scale.

The upper beam passes through a sample holder 71 which is of conventional design and interposes a predetermined thickness of material in the beam. For ultra-violet operation the sample holder should be provided with ends of quartz or other suitable ultra-violet transmitting material. The lower beam, which is usually referred to as the standard beam, passes through an opening in which is mounted a lens 72 focusing the beam onto a slit 73. A similar lens (not shown) focuses the upper beam leaving the sample holder 71 onto the upper portion of the same slit. Both the beams from the slit are turned by the total reflecting prism 76 mounted in the spectrograph 75. The two beams are collimated by the lens 17 onto the prism 18 which serves to disperse the beams to form two spectra, one above the other and to reflect them by means of its silvered mirror surface onto the photographic plate 19 which is held in a movable plate holder.

In operating the spectrophotometer, the first exposure is taken with the sample and standard beams equal and is of sufficient duration to cause a spectrum of the standard beam which is of the desired degree of intensity to register on the photographic plate in the form of lines of predetermined density. The spectrum of the sample beam will be less intense wherever the transmission of the sample for a particular wave length is less than 100%. The plate holder with the plate is then raised by an amount sufficient to permit the photographing of two further spectra. This is effected by a rack and pinion device 43 which is driven by a worm 39 through the shaft 36 from a driving motor 20. Universal joints 35 are provided in the shaft and a contact disk 38 is likewise rigidly connected to the shaft through an insulating disk 37. Two blades 41 press against the face and edge of the disk 38, respectively, and an insulated segment 40 is provided to interrupt contact of the blades 41 with the disk 38. Wires 44 and 45 lead from the blades 41. The shaft rotates one complete revolution automatically as will be described in conjunction with the description of the automatic features shown on Fig. 10. A hand wheel 42 is provided for manual setting.

The turning of the motor 20 which has just been described also turns the disk 21 through suitable bevel gearing and this transmits motion through the slipping clutch 22 and a jaw clutch 145 to a timing cylinder 24 (Figs. 1 and 3). The cylinder is provided with a helical channel 25 of fairly coarse pitch. A land 23 is left between adjacent grooves and thus there are two helical paths on the cylinder, one depressed and the other elevated. A follower 33 fits into the groove and is integral with a frame 29 which is slidable on two vertical rods or tracks 30 parallel to the axis of the cylinder 24. This frame carries a hinged member 34 with a pawl 32 adjacent to the follower 33 and bearing on the spiral land 23. The frame 29 also carries a solenoid coil 31 which when energized serves to pull up the hinged member 34 against the pressure of a small spring (shown in Fig. 4) and hence raises the pawl 32 from contact with the spiral land 23. On the spiral land there are located a number of pins 26 arranged at various distances depending on the timing intervals desired. These pins may advantageously be fitted into holes in the land, and additional holes can be provided so that various arrangements of pins can be chosen without requiring separate timing cylinders for each arrangement of intervals.

As the motor 20 starts, the coil 31 is energized for a short period as will be described in connection with Fig. 10 and raises the pawl 32. This permits the cylinder to turn and the pawl to pass over the pin against which it was situated before the motor started. After a short period of rotation which carries the pawl past the pin, the coil 31 is deenergized and the pawl drops by spring pressure onto the land 23. The cylinder continues to turn until the next pin on the land 23 strikes the pawl at which time the cylinder stops turning and the clutch 22 slips. The bevel gearing on the motor shaft is so arranged that the number of revolutions which the motor makes to turn the disk 38 through one revolution is greater than the number of revolutions required to turn the timing cylinder through the longest distance between pins. In other words, the clutch 22 will always slip toward the end of the cycle when the pawl 32 has locked the cylinder against further motion. The duration of this slipping period will vary with the intervals chosen by location of the various stopping pins 26.

The cylinder 24 turns a second cylinder 27 provided with a spiral scale (Figs. 1–4). The pitch of the threaded shaft 28 is much finer than that of the groove 25 in cylinder 24 and therefore the diaphragm closing member moves only a short distance.

When the motor 20 has run through the cycle governed by a single rotation of the disk 38, contact is broken between blades 41 and current ceases to flow to the motor 20 which stops under influence of its spring pressed brake 57 (Fig. 10). Thereupon the spark transformer 56 (Fig. 10) receives current and a spark is established between the electrodes 63 and 64. The duration of this spark is so timed that when multiplied by the area of the reduced opening 70, the product remains the same as during the first exposure. The beam leaving the opening 69 and passing through the sample, however, receives the full increment of exposure. After the spark has stopped, a second cycle is initiated by the timing mechanism shown in Fig. 10 and the motor 20 again turns to cause a second revolution of the disk 38, repeating the cycle except that the travel of the cylinder 24 will be different because of a different spacing of the ratchet stops 26. The cycle may be repeated for as many exposures as are provided in the timer in Fig. 10 and the number of ratchet pins 26 on the cylinder 24. When the full series of exposures have been made, the motor 20 is reversed, returning the plate holder to its original position. This is effected by a manual switch.

Fig. 10 shows the wiring diagram for the control of the spectrophotometer illustrated in Figs. 1–9. On the wiring diagram there are shown some of the parts shown in other figures such as the disk 38 with its contact blades 41, the motor 20, the solenoid 31, and the wires 65 and 66 leading to the electrodes 63 and 64. For convenience in understanding, the principal wires are shown as brought to a panel 143 on which sixteen wires, numbered 1–16, are shown.

In addition to the wires, there are shown diagrammatically a timing disk with three circular brass tracks 48, 49 and 50 and an arm 47 having contacts on all three brass tracks, the contacts being connected together. The arm 47 is turned by a synchronous timing motor 46 of conventional design which is shown in the diagram and is provided with a spring pressed brake 59 which during operation is held in a released position by the solenoid coil 60. There are also present on the diagram a step-down transformer 55, a spark transformer 56, five switches 77, 84, 91, 98 and 105, and five relays 112, 68, 125, 132 and 138.

A source of suitable alternating current, for example 110 v., 60 cycles A. C., is shown as coming through wires 53 and 54 which connect to wires 4 and 5 respectively. For convenience in identifying the phase of the 110 v. current, the wire 53 is marked ± and the wire 54 ∓. In the 6 v. step-down transformer 55, one side of the secondary winding is shown as connected to the ± side of the primary and the other end of the secondary is marked 6 v. For convenience in following the diagram, certain of the relay contacts are marked with the voltage or phase which they carry.

The operation will be described in conjunction with the starting of the first cycle, that is to say, the moving of the plate holder into the position for first exposure. When starting, the timer arm 47 is vertical and the contact on the brass track 49 rests on a narrow insulated segment 52 while the contact on the track 50 rests on the first of a series of spaced insulating segments 51 on track 50. The insulated segments 51 are wider than the insulated segment 52. In Fig. 10, the timer arm is shown to the left of the starting position in order to permit clear illustration of the insulated segments. Prior to starting, switch 77 is in the down position with blades 78 and 79 contacting contacts 82 and 83. Switch 84 is thrown into the upper position, that is to say, with the switch arms 85 and 86 contacting with the upper contacts 87 and 88. Similarly, switch 91 is in the down position with its arms 92 and 93 contacting with contacts 96 and 97. Switch 98 is in the upper position with its arms 99 and 100 contacting contacts 101 and 102 and switch 105 is in the position to the left with its arms 106 and 107 contacting contacts 108 and 109. With the switches in the positions shown, all five relays are de-energized and there is no current in the primary of the transformer 55 because one end of the primary wire 2 is not connected to wire 4. Disk 38 at the start is in a position so that blades 41 rest on the insulated segment 40.

In order to start, switch 77 is thrown up. Throwing the switch 77 up connects the ± phase of wire 4 through blade 86 and contact 88 of switch 84 to blade 78 of switch 77, thence through contact 80 to wire 2 which brings the step-down transformer into action. The same wire is connected through blade 134 and back contact 137 of relay 132 to the timer motor 46. The other side of the timer motor is connected to contact 87 of switch 84 and thence through blade 85 to wire 5 which is the other side of the 110 v. circuit. The coil 60 which is in parallel across the input of the motor 46 is also energized and releases the brake 59 permitting the timer motor 46 to turn. As soon as the timer arm 47 has passed off the insulated segment 52 of track 49, the latter is connected through the timer arm to track 48 and thence to wire 2 which is the ± side of the 6 v. secondary of transformer 55. One end of the coil of relay 132 is connected to track 49 and the other end through wire 1 to the 6 v. end of the secondary of transformer 55. Accordingly, the relay 132 is energized which brings the blades 133 and 134 into contact with the front contacts 135 and 136 respectively. This breaks the ± circuit to motor 46, coil 60 is de-energized and the brake 59 stops the turning of the motor so that the arm 47 will not move off the wider segment 51. The movement of blade 133 to front contact 135 throws ∓ phase from the wire 5 onto blade 127 of relay 125. Similarly, the movement of blade 134 to front contact 136 connects the ± of the wire 4 to blade 126 of relay 125 and blade 113 of relay 112. Relay 125 remains de-energized because the ± end of the coil is connected to track 50 and the timer arm has not yet left insulated segment 51. ± is put on back contact 130 of relay 125 which is connected to wire 14 going to the coil 31 of the ratchet. 6 v. is connected from wire 1 to blade 120 of relay 68 and thence through back contact 124 to wire 13 which goes to the other end of the ratchet coil 31. Accordingly, this coil is energized, the pawl 32 is withdrawn, and cylinder 24 is free to turn.

± voltage is applied to blade 113 of relay 112 through back contact 117 to blade 119 of relay 68, thence through back contact 123 to wire 8 which extends to contact 97 of switch 91, thence to blade 93 thereof, to contact 108 of switch 105, through blade 106 to the starting coil of motor 20. A branch of the connection from blade 93 goes to blade 100 of switch 98, thence to contact 102, from there to contact 109 of switch 105, and through blade 107 to the field of motor 20. The ∓ connects through blade 133 of relay 132 to front contact 135 leading to blade 127 of relay 125 and thence through back contact 131 to wire 9 which in turn runs to contact 96 of switch 91, to blade 92 thereof, and thence directly to the other end of the field of motor 20. A branch of this latter wire runs to contact 101 of switch 98, thence to blade 99 and to the ∓ end of the starting coil of motor 20. This motor starts, therefore, in the normal direction since current from the input flowing through the coil 58 has released the brake 57. Disk 38 turns until the contacts 41 leave the insulated section 40 and have connected the 6 v. to wire 10 which goes to contact 83 of switch 77.

As soon as the above operations have begun and before motor 20 has gone through the full cycle, switch 77 is thrown to its lower position. This throws ± from the blade 78 through contact 82 onto the power relay 138. The relay is, however, not energized because its other end, which is connected through wire 11 to the front contact 129 of relay 125, is broken at that point. 6 v. runs from contact 83 as described above through blade 79 onto one end of the coil of relay 112. The other end is connected to ± by wire 14. Relay 112 accordingly operates the blades 113 and 114 moving from back contacts 117 and 118 to front contacts 115 and 116. The movement of the blade 113 breaks the connection through blade 119 of back contact 123 of relay 68 to wire 8 but re-establishes a direct connection to wire 8 through front contact 115. The movement of the blade 114 places 6 v. on front contact 116 which leads to one end of the coil of relay 68, the other end of the coil being connected to ± at wire 14. Relay 68, therefore, operates and since 6 v. is also on the blade 120 direct from wire 1 and the 6 v. end of relay coil 68 is connected to front contact 122, the relay remains energized and locks itself in position. The same movement of the blade 120 breaks the 6 v. connection to wire 13 and accordingly, de-energizes the coil 31 in the ratchet. Since, however, the motor 20 has been turning and has therefore moved the cylinder 24, the pawl 32 rides on the top of the pin or is beyond it and the cylinder is free to turn until the pawl strikes the next pin. Both relays 112 and 68 remain energized while motor 20 completes its cycle, that is to say, until contacts 41 strike the insulated segment 40 which breaks connections between 6 v. and wire 10 and hence de-energizes relay 112 breaking the circuit to wire 8 and therefore stopping the motor 20. The brake 57 is applied as soon as current ceases to flow through the coil 58 and prevents the motor 20 from coasting past its stopping position.

The above operation causes the blades 114 and 113 to return to their back contacts and places 6 v. on back contact 118 which is connected to one side of the coil of relay 125. In the meantime, blade 119 has put ± current from the back contact 117 of relay 112 onto front contact 121 and from there into the motor 46 which begins to turn and moves the timer arm off the segment 51. This energizes relay 125 which breaks the circuit to motor 20 through the movement of blade 127 from back contact 131 to front contact 129. At the same time, the ± on blade 126 is removed from wire 14 and placed on front contact 128 connecting it to the motor 46. The removal of the ± from wire 14 causes relay 68 to de-energize but the timing motor 46 continues to operate.

The ∓ from blade 127 is put on one end of the coil of relay 138 through front contact 129 and wire 11. Wire 12 is already connected to ± through the switch 77 and hence current flows through the coil of 138, energizing the same and causing blades 139 and 140 to make contact with 141 and 142 which connects wires 4 and 5 leading to these contacts to wires 15 and 16 leading to the spark transformer 56 which produces a spark between the electrodes 63 and 64. The spark continues as long as relay 125 is energized, that is to say, until the timer arm 47 strikes the next insulating segment 51 at which time connection from ± to relay 125 is broken. The relay de-energizes, stopping the timing motor 46, which is prevented from coasting by its brake 59, and restoring the circuits to the condition obtaining when the starting switch 77 had been depressed after timer arm 47 had left the insulating segment 52. The cycle then repeats, the motor 20 starting for the second cycle, de-energization of relay 125 having restored current to the wire 14 and therefore having energized the coil 31 which withdraws the pawl.

The length of time during which the spark is maintained is determined by the distance between segments 51 on the track 50 as the timer arm 47 is driven at constant speed whenever the motor 46 is running. The segments 51 are arranged to give exposure intervals inversely proportional to the aperture of the standard beam determined by the position of cylinder 24 determined by the location of the pin in contact with the pawl. For spectrophotometric purposes, it is usually preferable to arrange the intervals logarithmically because density on the photographic plate is a logarithmic function of exposure. However, the intervals may be chosen of any desired length which may be required by the conditions of the problem.

When the full number of cycles have been gone through, the timer arm 47 strikes the insulating segment 52. This de-energizes relay 132 and since switch 77 is in the down position, current is cut off from the step-down transformer 55 and the circuits returned to the position occupied at the start.

While the plate holder can be returned to its original position by hand, it is simpler to provide means for returning it to its original position electrically. This is effected by means of the switches 84, 91, 98 and 105, the latter being automatically thrown to its right-hand position when the plate holder reaches its upper limit because the stop 144 strikes the arm of switch 105. This is a safety device to prevent the motor 20 from continuing to turn in case of sticking contacts which might damage the plate holder drive. Switch 105 is essentially known as a reversing switch, but when thrown to its reverse position, the motor will not begin to reverse unless switch 98 is thrown down. When switch 98 is thrown down with switch 105 in its right-hand position, the polarity of the starting coil can be reversed, the blade 106 striking contact 110 which is connected to blade 92. Similarly, the other end of the starting coil is connected through blade 99 of switch 98 to contact 103 and thence to blade 93 of switch 91. In order to reverse motor 20, it is now necessary to throw switch 91 up and switch 84 down. Blade 93 of switch 91 then strikes contact 95 on wire 6 which leads to ± and ∓ respectively through blade 107, contact 111, contact 104, blade 108 and blade 93 and through blade 92 and contact 94. The motor therefore turns in the reverse direction, returning the plate holder to its original position where a second stop 146 throws switch 105 to the left (Fig. 10), stopping the motor. The beveling of the pawl 32 is such that it climbs over the stops when the cylinder 24 turns in the reverse direction. Since the motor 20 will turn through a fairly large number of revolutions of the disk 38, there will be considerable slippage of the clutch 22 because the cylinder 24 will be turned back to starting position long before motor 20 stops turning. If desired, wear on the clutch can be minimized by throwing out the jaw clutch 145 connecting the cylinder 24 to the drive and turning back the former by hand.

What I claim is:

1. A spectrophotometer comprising in combination and in optical alignment a source of actinic radiant energy, a device splitting energy received from said source into two equal beams, an adjustable diaphragm for one of said beams, a sample holder for transmission samples located in the other beam, means for directing both beams after one has passed through the sample onto a dispersing device to form adjacent spectra, means for imaging said spectra on a photographic surface, driving means positively moving said photographic surface, an interval determining member driven from said driving means through a clutch capable of slipping on an over-load, disengageable means for locking said member at various intervals of travel, means for adjusting the diaphragm actuated by movement of said member, means for automatically causing the driving means to drive the photographic surface through a predetermined distance including means for temporarily effecting disengagement of the locking means at the beginning of the movement of the interval determining member, means actuated by the photographic surface driving means at the end of its predetermined travel to cause radiant energy to strike the energy splitting means for a predetermined time interval, and means for automatically starting the complete drive for another cycle at the end of the exposure.

2. A spectrophotometer according to claim 1 in which the interval determining member is a rotatable cylinder provided with a helical drive with stops traversed by a ratchet pawl which constitutes the locking means, the spacing of the stops determining the lengths of the intervals of travel of the diaphragm adjusting means.

3. A spectrophotometer according to claim 1 in which the means for causing radiant energy to strike the energy splitting means comprises an electrically operated timing switch provided with a timing member operating through a plurality of successive time intervals, said switch closing an electric circuit actuating the source of radiant energy during each time interval, a switch actuated by the photographic surface driving means at the end of its predetermined travel, said switch on actuation starting the timing member of the timing switch, and means associated with the timing switch to cause the timing member to stop at the end of each timing interval and to simultaneously start the photographic surface driving means.

DAVID RICHARDSON.